Patented Apr. 3, 1951

2,547,640

UNITED STATES PATENT OFFICE 2,547,640

ISOLATION OF PENICILLIN

Leon Goldman, Nyack, N. Y., assignor to American Cyanamid Company, New York, N. Y., a corporation of Maine No Drawing. Application March 17, 1948, Serial No. 15,490

17 Claims. (Cl. 260—302)

This invention relates to penicillin and the production and purification thereof. More particularly, the invention relates to an improvement in processes of purifying penicillin and in separating penicillin G from other penicillins and impurities associated therewith.

The discovery of penicillin and its remarkable therapeutic value has led to its production on a large commercial scale. Early processes yielded a relatively impure product of variable composition containing unknown substances in addition to the desired antibiotic. Investigations concerning the nature of the product led to the discovery that commercially produced penicillin contained several active penicillins which were variously designated penicillin F, penicillin K, penicillin X, penicillin G, and the like. Of these, penicillin G, also called benzylpenicillin, is considered the most important.

Unfortunately, the presently known methods of extracting penicillin from the fermentation liquor have not been satisfactory because of the many process steps involved and the great loss of penicillin suffered while isolating the pure material. Although pure penicillin and, in particular, crystalline salts of penicillin G have been obtained, it has been considered necessary to first prepare a relatively concentrated solution of penicillin in an anhydrous organic solvent and precipitate the penicillin therefrom as an insoluble salt. It has also been considered necessary to conduct the crystallization operation at very low temperatures to avoid decomposition of the penicillin. The yields have been low. All of the factors make known crystallization procedures expensive. Also, some previously used processes were not capable of separating penicillin G from other less desirable penicillins.

I have discovered that relatively pure penicillin in salt form can be obtained in good yields by a simple process from aqueous solutions of penicillin at substantially neutral conditions and at room temperature. This discovery has been utilized on a large scale to recover penicillin from its aqueous fermentation liquor and has greatly simplified the problem of obtaining pure crystalline penicillin G.

In accordance with my new process an aqueous solution of penicillin is prepared. Solutions of 5,000 or more Oxford units of penicillin per ml. are preferred, but it is not necessary for the operation of the process that the aqueous solution be so strong. Solutions having 5,000 or more Oxford units per ml. may be obtained by concentrating filtered fermentation liquor, containing the usual commercially achieved quantities of penicillin, by vacuum evaporation or otherwise, or by extracting a solution of penicillin in a water immiscible organic solvent with an aqueous solution containing an alkaline substance and/or buffer agents.

The final aqueous extract containing the penicillin should be adjusted to have a pH within the range of about pH 4.5 to 8.5 by treatment of the solution with an alkali or acid and/or buffer agents. Under these conditions the penicillin in the aqueous solution is most probably in the form of one of its salts, disassociated to some extent, as would be expected. Various salting out agents are also added. These include ammonium sulfate, ammonium chloride, sodium chloride, sodium sulfate, magnesium sulfate, lithium sulfate, calcium nitrate, sodium tetraphosphate and various alkali metal phosphates, pyrophosphates, metaphosphates and the like. Salting out agents are well known to those skilled in the art, and the selection and use thereof is susceptible to considerable variation. The amount of salting out agent in the solution may vary considerably and will be from about 5% to 40% by weight, based on the total weight of the aqueous solution.

To the solution of penicillin salt described above there is then added an amine which forms a salt with penicillin having a favorable partition coefficient for extraction into a water immiscible solvent from the aqueous solution under the conditions described. The amine is added as the free base or as one of its acid salts. When the free amine is added, an acid should be added at substantially the same time so that the pH of the aqueous solution is maintained within the range pH 4.5 to pH 8.5.

An apparent distinction exists between the suitability of the tertiary amines on the one hand and the primary and secondary amines on the other. In the case of the tertiary amines they should be strongly basic, having an ionization constant of at least $1 \times 10^{-4}$. Suitable tertiary amines include triethylamine, the preferred amine of the present invention, but also tri-isobutylamine, N,N'-dimethylpiperazine, N-ethylpiperidine, and still others. Primary amines and secondary amines that are suitable for use in the process of the present invention appear to have a relatively narrow range of basicity and in general, may be weaker than the tertiary amines. As will be apparent from the numerous examples which follow, primary and secondary amines having an ionization constant of between about $1 \times 10^{-5}$ and $1 \times 10^{-2}$ are suitable for use in the process. Among such primary and secondary amines may be mentioned isoamylamine, 2-amino-n-octane, alpha-phenylethylamine, cyclohexylamine, butylamine, ethylamine, isobutylamine, methylamine, diisopropylamine, diethylamine, diisoamylamine, diisobutylamine, dimethylamine, piperidine, and still other primary and secondary amines. Obviously, some of these amines are better than others in the process, and different amines give better results with particular solvents. Optimum conditions can readily be determined by those skilled in the art following the teachings of the present invention.

The amine or amine salt is added in at least stoichiometric proportions to the penicillin present in the aqueous solution but more preferably in a large excess within the range of from 1 to 20 times or even more, as much of the amine as penicillin on a molecular basis. The solutions may be maintained during this time at room temperature, although lower temperatures or slightly higher temperatures will not detract seriously from the operation of the process.

To the aqueous solution, as just described, is then added a water immiscible organic solvent in which the substituted ammonium penicillin salt, formed as a result of addition of the amine, is soluble. Chloroform appears to be the best water immiscible solvent for the triethylammonium salt of penicillin and is preferred. Other water immiscible organic solvents such as ethylene dichloride, secondary butanol, methyl n-propyl ketone, n-pentanol, n-butanol, or methyl isobutyl ketone, may also be used however.

After intimately contacting the liquids and separating them by decantation or otherwise, the water immiscible organic solvent containing dissolved penicillin is removed from the aqueous phase. The extraction process may be conducted in separatory funnels, in counter current columns or in continuous centrifugal separators of types known in the art. The solution of the amine salt of penicillin which contains the salt of penicillin G, as well as corresponding salts of other penicillins, may then be evaporated at room temperature, more or less, in vacuo, if desired, and the penicillin salt recovered therefrom. Under suitable conditions penicillin may be recovered therefrom by simple crystallization.

A particularly advantageous way of obtaining penicillin G is to evaporate some of the solution and then add a second organic solvent, such as amyl acetate, in which the desired penicillin G amine salt is less soluble than the corresponding amine salts of penicillin K and other less desirable forms of penicillin. The concentration is continued until the first solvent has been removed. Evaporation is then stopped, and the solution is cooled and allowed to stand until no more crystals of the desired amine salt of penicillin G separate from solution. The product may be washed with acetone, and the highly purified crystalline salt of penicillin G obtained.

Another method of obtaining the pure crystals of penicillin G is to evaporate off the original organic solvent used in the extraction until penicillin G precipitates from solution. The crystalline material may then be washed with methyl ethyl ketone or other solvent in which the penicillin G is relatively insoluble, whereby the impurities are removed from the crystalline material.

To illustrate the invention in greater detail, the following examples are offered. It should be understood that these are merely illustrative and should not be construed to limit the invention to the particular details thereof. All parts are by weight unless otherwise indicated.

EXAMPLE 1

To one liter of a solution of crude sodium salt of penicillin having a potency of 6,430 units/ml. were added 150 grams of ammonium sulfate, 4.6 ml. of 85% phosphoric acid, and 30.8 ml. of triethylamine. The resulting solution of pH 7.47 was extracted with four 100 ml. portions of cold chloroform. The four extracts assayed respectively 43,000 units/ml., 14,700 units/ml., 4,500 units/ml., and 2,200 units/ml., totaling 100% of the original units.

The first three extracts were combined and evaporated in vacuo at room temperature until a crystalline slurry formed. Then 15 ml. of amyl acetate was added, evaporation was continued to remove more chloroform, and finally 5 ml. of acetone was added. After chilling overnight, the crystals were filtered and washed with acetone, yielding 3.13 g. of crystalline triethylammonium benzylpenicillin, assaying 1,285 units/mg. and 93.9% benzylpenicillin by weight.

EXAMPLE 2

To 149 liters of a solution of crude sodium salt of penicillin having a potency of 6,490 units/ml. were added 23 kg. of ammonium sulfate, 570 ml. of 85% phosphoric acid, and 5.1 liters of triethylamine. The resulting solution of pH 7.4 was extracted four times with equal volumes of chloroform. The total chloroform extract (33.35 liters), containing 936 million units (96.4% of the original units), was concentrated in a vacuum still until crystals formed. One liter of amyl acetate was added and distillation was continued to remove more chloroform. Then 2 liters of acetone was added, and the slurry was agitated and chilled overnight. The resulting crystals were filtered, washed with acetone, and dried in vacuo. The yield was 554 g. of colorless crystalline triethylammonium benzylpenicillin, assaying 1,270 units/mg.

EXAMPLE 3

To 500 ml. of an aqueous solution of 6.5 million units of sodium penicillin, 0.218 mole of triethylammonium chloride and 65 grams of ammonium sulfate, was added 0.4–0.5 ml. of 7.5% sodium hydroxide to adjust the pH to 6.5. The resulting solution was extracted with six 50 ml. portions of ethylene dichloride, and the extracts were combined and assayed.

The above procedure was repeated using the following solvents: methyl n-propyl ketone, methyl isobutyl ketone, n-butanol, sec-butanol, and n-pentanol.

*Table I*

| Solvent | Number of Extractions and Volume (ml.) of each | Total Volume of Extract, ml. | Potency, units/ml. | Total Units in Extract ×10⁶ | Per Cent of Original Units |
|---|---|---|---|---|---|
| Ethylene dichloride | 6:50 | 293 | 5,225 | 1.53 | 23.6 |
| Methyl n-propyl ketone | 6:50 | 286 | 4,600 | 1.32 | 20.3 |
| Methyl isobutyl ketone | 6:50 | 292 | 2,050 | 0.598 | 9.2 |
| n-butanol | 6:50 | 295 | 14,000 | 4.13 | 63.6 |
| sec-butanol | 1:40, 6:50 | 358 | 15,000 | 5.37 | 82.7 |
| n-pentanol | 6:50 | 275 | 12,600 | 3.47 | 53.3 |

EXAMPLE 4

A solution of cyclohexylammonium phosphate, prepared by mixing together 21.9 grams of cyclohexylamine, 5.5 ml. of 85% phosphoric acid and 100 ml. of water, was added to a solution of 5.0 grams of sodium penicillin (6.5 million units) and 65 grams of ammonium sulfate in 100 ml. of water. To the resulting solution 100 ml. of water was added, and 45 ml. of 0.5 M sodium hydroxide to adjust the pH to 7.39. Six 40 ml. chloroform extractions were made, and assay of the combined chloroform extract was 9,460 units/ml. (38% of the original units). The chloroform extract was dried over anhydrous sodium sulfate and distilled to dryness in vacuo at room temperature, yielding 2.3 grams of cyclohexylammonium penicillin assaying 847 units/mg.

EXAMPLE 5

A solution of 1 g. of sodium penicillin (assaying 1300 units/mg.), 40 grams of ammonium sulfate, 5.3 ml. of cyclohexylamine, and 4.0 ml. of 85% phosphoric acid in 200 ml. of water was adjusted to pH 5.39 by adding 0.5 M NaOH, and extracted with six 20 ml. portions of chloroform. The combined chloroform extract, which assayed 4,800 units/ml., was chilled one hour, and the crystals of cyclohexylammonium penicillin were removed by filtration and washed twice with 50 ml. portions of petroleum ether. The yield was 0.36 g. assaying 1,318 units/mg.

EXAMPLE 6

Six 1.00 gram samples of sodium penicillin, assaying 1,530 units/mg., and 20 gram portions of ammonium sulfate were dissolved in 50 ml. of water, respectively. To each was added, respectively, a solution of 0.0514 mole of an amine selected from the list in Table II and 4.33 ml. of hydrochloric acid, sp. gr. 1.19, in 10 ml. of water and the pH adjusted with 1.5–2 ml. of 7.5% NaOH to pH 7.50. The resulting solutions were adjusted to pH 6.50, and water was added to bring the volumes to 100 ml. The solutions were extracted with six 10 ml. portions of chloroform, and the combined chloroform extracts were assayed for penicillin content.

Table II

| Amine | Volume of CHCl$_3$ Extract, ml. | units/ml | Total units ×10⁶ | Per Cent of Original units |
|---|---|---|---|---|
| diisopropylamine | 53 | 9,850 | 0.522 | 34.1 |
| beta-amino-n-octane | 53 | 23,400 | 1.24 | 81.0 |
| dl-alpha-phenylethylamine | 53 | 11,925 | 0.632 | 41.3 |
| piperidine | 51 | 2,700 | 0.138 | 9.0 |
| beta-phenylethylamine | 51 | 4,375 | 0.223 | 14.6 |
| isoamylamine | 51 | 3,875 | 0.198 | 12.9 |

EXAMPLE 7

To 150 ml. of an aqueous solution of 6.5 million units of sodium penicillin and 65 grams of ammonium sulfate was added 175 ml. of a solution of 12.5 grams of N,N'-dimethylpiperazine and 4.0 ml. of 85% phosphoric acid. The resulting solution was diluted to 325 ml., 1.2 ml. of phosphoric acid was added to bring the pH to 6.50, and then the solution was extracted with six 40 ml. portions of chloroform. The combined chloroform extract, 232 ml. assaying 23,950 units/ml., was dried over anhydrous sodium sulfate, and distilled in vacuo to dryness, yielding 5.4 grams of N,N'-dimethylpiperazinium penicillin, assaying 1,050 units/mg.

EXAMPLE 8

A solution of 6.5 million units of sodium penicillin and 65 grams of ammonium sulfate in 150 ml. of water was combined with a solution of 22.1 grams of N-ethylpiperidine and 6.5 ml. of 85% phosphoric acid in 150 ml. of water. The resulting solution was adjusted to pH 7.40 by adding 14 ml. of 0.5 M sodium hydroxide and was then extracted with six 40 ml. portions of chloroform. The combined chloroform extract was dried over anhydrous sodium sulfate and distilled in vacuo to dryness. The yield of N-ethylpiperidinium penicillin was 4.4 grams, assaying 1,226 units/mg.

EXAMPLE 9

A solution of 61.2 million units of sodium penicillin, 520 grams of ammonium sulfate, and 47 ml. of 2.18 M triethylammonium chloride solution was diluted with water to 3,080 ml. and divided into eight portions of 385 ml. each. To each was added, respectively, the following quantities of 2.18 M triethylammonium chloride: 94.1, 69.1, 44.1, 34.1, 24.1, 14.1, 4.1, and 0 ml., and each was diluted to 500 ml. and the pH adjusted to 6.08–6.16. The solutions were extracted with six 50 ml. portions of chloroform, and the pooled chloroform extracts were evaporated in vacuo to dryness. The residues were crystallized from chloroform-ethyl acetate mixtures to yield pure triethylammonium penicillin in the amounts shown in Table III.

Table III

| Molar Excess of Triethylamine | Triethylammonium Penicillin | | |
|---|---|---|---|
| | weight, g. | units/mg. | Unit Per Cent Yield |
| 16.0 | 4.96 | 1,360 | 88 |
| 11.75 | 4.71 | 1,360 | 84 |
| 7.5 | 4.59 | 1,370 | 82 |
| 5.8 | 4.66 | 1,350 | 82 |
| 4.1 | 4.46 | 1,360 | 79 |
| 2.4 | 4.39 | 1,360 | 78 |
| 0.7 | 3.94 | 1,350 | 70 |
| 0 | 2.36 | 1,350 | 42 |

EXAMPLE 10

To solutions of 6.5 million units of sodium penicillin in 100 ml. of 2.18 M triethylammonium chloride solution, each of the salts in Table IV was added, respectively, each was diluted with water to 325 ml., and the pH of each was adjusted to 6.00 by adding 7.5% sodium hydroxide or 18% hydrochloric acid as needed. The resulting solutions were extracted with six 40 ml. portions of chloroform, the combined chloroform extracts were dried over anhydrous sodium sulfate, and the extracts were distilled to dryness in vacuo. The residues were then crystallized from chloroform-ethyl acetate to yield pure triethylammonium penicillin.

Table IV

| Salts Added | Weight, g. | Combined CHCl$_3$ Extract | | Triethylammonium Penicillin | |
|---|---|---|---|---|---|
| | | ml. | units/ml. | Grams | Units/mg. |
| (NH$_4$)$_2$SO$_4$ | 32.5 | 220 | 25,200 | 3.73 | 1,335 |
| (NH$_4$)$_2$SO$_4$ | 65 | 220 | 23,400 | 3.77 | 1,345 |
| MgSO$_4$.7H$_2$O | 60 | 220 | 23,400 | 3.49 | 1,350 |
| MgSO$_4$.7H$_2$O | 120 | 225 | 26,300 | 3.50 | 1,310 |
| Li$_2$SO$_4$.H$_2$O | 31.2 | 222 | 23,800 | 3.57 | 1,375 |
| Li$_2$SO$_4$.H$_2$O | 62.4 | 225 | 29,800 | 3.77 | 1,350 |
| Ca(NO$_3$)$_2$.4H$_2$O | 57.5 | 220 | 16,000 | 1.95 | 1,355 |
| Ca(NO$_3$)$_2$.4H$_2$O | 115 | 226 | 15,600 | 1.77 | 1,350 |
| Na$_6$P$_4$O$_{13}$ | 28.6 | 224 | 23,900 | 3.52 | 1,305 |
| Na$_6$P$_4$O$_{13}$ | 57.2 | 220 | 24,500 | 3.77 | 1,325 |

I claim:

1. A process of obtaining substituted ammonium salts of penicillin from aqueous solutions thereof which comprises the steps of preparing an aqueous solution of penicillin having a pH within the range 4.5 to 8.5 and containing from about 5% to 40% by weight of a salting out agent and adding thereto a large stoichiometric excess, based on the penicillin present in said solution, of an organic amine having a dissociation constant of at least $1\times10^{-5}$ while maintaining the pH within the range 4.5 to 8.5, thereafter mixing the aqueous solution containing the resulting substituted ammonium penicillin salt with a water immiscible organic solvent, separating the organic solvent from the aqueous phase and recovering from said organic solvent the substituted ammonium salt of penicillin.

2. A process of obtaining substituted ammonium salts of penicillin from aqueous solutions thereof which comprises the steps of preparing an aqueous solution of penicillin having a pH within the range 4.5 to 8.5 and containing between about 5% to 40% by weight of a salting out agent and adding thereto from about 1 to 20 mols, based on the penicillin present in said solution, of an organic amine having a dissociation constant of a least $1\times10^{-5}$ while maintaining the pH within the range 4.5 to 8.5 and thereafter mixing the aqueous solution with chloroform, separating the chloroform from the aqueous phase and recovering the substituted ammonium salt of penicillin by evaporation of the chloroform.

3. A process of obtaining crystalline substituted ammonium salts of penicillin which comprises the steps of preparing an aqueous solution containing penicillin G having a pH within the range 4.5 to 8.5 and containing between about 5% to 40% by weight of a salting out agent and adding thereto from about 1 to 20 mols, based on the penicillin present in said solution, of an organic amine having a dissociation constant of at least $1\times10^{-5}$ while maintaining the pH within the range 4.5 to 8.5, and thereafter mixing the aqueous solution with chloroform, separating the chloroform from the aqueous phase and evaporating the chloroform until part of the volume thereof has been reduced, adding amyl acetate, continuing the evaporation of the mixed solvents until the amine salt of penicillin G has separated therefrom, and thereafter separating the insoluble amine salt of penicillin G from its mother liquor.

4. A process of obtaining substituted ammonium salts of penicillin from aqueous solutions thereof which comprises the steps of preparing an aqueous solution of penicillin having a pH within the range 4.5 to 8.5 and containing from about 5% to 40% by weight of a salting out agent and adding thereto a large stoichiometric excess, based on the penicillin present in said solution, of a tertiary amine having a dissociation constant of at least $1\times10^{-4}$ while maintaining the pH within the range 4.5 to 8.5, thereafter mixing the aqueous solution containing the resulting substituted ammonium penicillin salt with a water immiscible organic solvent, separating the organic solvent from the aqueous phase and recovering by evaporation of the organic solvent the substituted ammonium salt of penicillin.

5. A process of obtaining substituted ammonium salts of penicillin from aqueous solutions thereof which comprises the steps of preparing an aqueous solution of penicillin having a pH within the range 4.5 to 8.5 and containing from about 5% to 40% by weight of a salting out agent and adding thereto a large stoichiometric excess, based on the penicillin present in said solution, of a secondary amine having a dissociation constant within the range $1\times10^{-5}$ to $1\times10^{-2}$ while maintaining the pH within the range 4.5 to 8.5, thereafter mixing the aqueous solution containing the resulting substituted ammonium penicillin salt with a water immiscible organic solvent, separating the organic solvent from the aqueous phase and recovering by evaporation of the organic solvent the substituted ammonium salt of penicillin.

6. A process of obtaining substituted ammonium salts of penicillin from aqueous solutions thereof which comprises the steps of preparing an aqueous solution of penicillin having a pH within the range 4.5 to 8.5 and containing from about 5% to 40% by weight of a salting out agent and adding thereto a large stoichiometric excess, based on the penicillin present in said solution, of a primary amine having a dissociation constant within the range $1\times10^{-5}$ to $1\times10^{-2}$ while maintaining the pH within the range 4.5 to 8.5, thereafter mixing the aqueous solution containing the resulting substituted ammonium penicillin salt with a water immiscible organic solvent, separating the organic solvent from the aqueous phase and recovering by evaporation of the organic solvent the substituted ammonium salt of penicillin.

7. A process of obtaining substituted ammonium salts of penicillin from aqueous solutions thereof which comprises the steps of preparing an aqueous solution of penicillin having a pH within the range 4.5 to 8.5 and containing between about 5% to 40% by weight of a salting out agent and adding thereto from about 1 to 20 mols, based on the penicillin present in said solution, of a tertiary amine having a dissociation constant of at least $1\times10^{-4}$ while maintaining the pH within the range 4.5 to 8.5, and thereafter mixing the aqueous solution with chloroform, separating the chloroform from the aqueous phase and recovering from the chloroform the substituted ammonium salt of penicillin.

8. A process of obtaining substituted ammonium salts of penicillin from aqueous solutions thereof which comprises the steps of preparing an aqueous solution of penicillin having a pH within the range 4.5 to 8.5 and containing between about 5% to 40% by weight of a salting out agent and adding thereto from about 1 to 20 mols, based on the penicillin present in said solution, of a secondary amine having a dissociation constant within the range $1\times10^{-5}$ to $1\times10^{-2}$ while maintaining the pH within the range 4.5 to 8.5, and thereafter mixing the aqueous solution with chloroform, separating the chloroform from the aqueous phase and recovering from the chloroform the substituted ammonium salt of penicillin.

9. A process of obtaining substituted ammonium salts of penicillin from aqueous solutions thereof which comprises the steps of preparing an aqueous solution of penicillin having a pH within the range 4.5 to 8.5 and containing between about 5% to 40% by weight of a salting out agent and adding thereto from about 1 to 20 mols, based on the penicillin present in said solution, of a primary amine having a dissociation constant within the range $1\times10^{-5}$ to $1\times10^{-2}$ while maintaining the pH within the range 4.5 to 8.5, and thereafter mixing the aqueous solution with chloroform, separating the chloroform from the aqueous phase and recovering from the chloroform the substituted ammonium salt of penicillin.

10. A process of obtaining substituted ammonium salts of penicillin from aqueous solutions thereof which comprises the steps of preparing an aqueous solution of penicillin having a pH within the range 4.5 to 8.5 and containing between about 5% to 40% by weight of a salting out agent and adding thereto from about 1 to 20 mols, based on the penicillin present in said solution, of an organic amine having a dissociation constant of at least $1 \times 10^{-5}$, and thereafter mixing the aqueous solution with secondary butanol, separating the secondary butanol from the aqueous phase and recovering the substituted ammonium salt of penicillin by evaporation of the butanol.

11. A process of obtaining substituted ammonium salts of penicillin from aqueous solutions thereof which comprises the steps of preparing an aqueous solution of penicillin having a pH within the range 4.5 to 8.5 and containing between about 5% to 40% by weight of ammonium sulfate and adding thereto from about 1 to 20 mols, based on the penicillin present in said solution, of an organic amine having a dissociation constant of at least $1 \times 10^{-5}$ while maintaining the pH within the range 4.5 to 8.5, and thereafter mixing the aqueous solution with chloroform, separating the chloroform from the aqueous phase and recovering the substituted ammonium salt of penicillin by the evaporation of the chloroform.

12. In a process of recovering penicillin from aqueous solutions thereof the improvement which comprises the steps of adding to an aqueous solution, containing at least 5,000 Oxford units of penicillin per milliliter and having a pH within the range 4.5 to 8.5 and containing between about 5% to 40% by weight of a salting out agent, at least a stoichiometric quantity of triethylamine, based on the penicillin present in said solution, while maintaining the pH of the aqueous solution within the range of 4.5 to 8.5, and thereafter intimately mixing the aqueous solution with chloroform whereby the triethylamine salt of penicillin is extracted from the aqueous phase into the chloroform, separating the chloroform from the aqueous phase, and evaporating the chloroform until the triethylamine salt of penicillin is separated therefrom.

13. In a process of recovering penicillin from aqueous solutions thereof the improvement which comprises the steps of adding to an aqueous solution, containing at least 5,000 Oxford units of penicillin per milliliter and having a ph within the range 4.5 to 8.5 and containing between about 5% to 40% by weight of a salting out agent, at least a stoichiometric quantity of beta-amino-n-octane, based on the penicillin present in said solution, while maintaining the pH of the aqueous solution within the range 4.5 to 8.5, and thereafter intimately mixing the aqueous solution with chloroform whereby the beta-amino-n-octane salt of penicillin is extracted from the aqueous phase into the chloroform, separating the chloroform from the aqueous phase, and evaporating the chloroform until the beta-amino-n-octane salt of penicillin is separated therefrom.

14. In a process of recovering penicillin from aqueous solutions thereof the improvement which comprises the steps of adding to an aqueous solution, containing at least 5,000 Oxford units of penicillin per milliliter and having a pH within the range 4.5 to 8.5 and containing between about 5% to 40% by weight of a salting out agent, at least a stoichiometric quantity of N,N'-dimethylpiperazine, based on the penicillin present in said solution, while maintaining the pH of the aqueous solution within the range 4.5 to 8.5, and thereafter intimately mixing the aqueous solution with chloroform whereby the N,N'-dimethylpiperazinium salt of penicillin is extracted from the aqueous phase into the chloroform, separating the chloroform from the aqueous phase, and evaporating the chloroform until the N,N'-dimethylpiperazinium salt of penicillin is separated therefrom.

15. In a process of recovering penicillin from aqueous solutions thereof the improvement which comprises the steps of adding to an aqueous solution, containing at least 5,000 Oxford units of penicillin per milliliter and having a pH within the range 4.5 to 8.5 and containing between about 5% to 40% by weight of a salting out agent, at least a stoichiometric quantity of N-ethylpiperidine, based on the penicillin present in said solution, while maintaining the pH of the aqueous solution within the range 4.5 to 8.5, and thereafter intimately mixing the aqueous solution with chloroform whereby the N-ethylpiperidinium salt of penicillin is extracted from the aqueous phase into the chloroform, separating the chloroform from the aqueous phase, and evaporating the chloroform until the N-ethylpiperidinium salt of penicillin is separated therefrom.

16. A process of obtaining substituted ammonium salts of penicillin from aqueous solutions thereof which comprises the steps of preparing an aqueous solution of penicillin having a pH within the range 4.5 to 8.5 and containing between about 5% to 40% by weight of sodium tetraphosphate and adding thereto from about 1 to 20 mols, based on the penicillin present in said solution, of an organic amine having a dissociation constant of at least $1 \times 10^{-5}$ while maintaining the pH within the range 4.5 to 8.5, and thereafter mixing the aqueous solution with chloroform, separating the chloroform from the aqueous phase and recovering from the chloroform the substituted ammonium salt of penicillin.

17. A process of obtaining crystalline substituted ammonium salts of penicillin G which comprises the steps of preparing an aqueous solution of penicillin having a pH within the range 4.5 to 8.5 and containing between about 5% to 40% by weight of a salting out agent and adding thereto from about 1 to 20 mols, based on the penicillin present in said solution, of an organic amine having a dissociation constant of at least $1 \times 10^{-5}$ while maintaining the pH within the range 4.5 to 8.5, and thereafter mixing the aqueous solution with chloroform, separating the chloroform from the aqueous phase and evaporating the chloroform until crystals of the substituted ammonium salt of penicillin G separate therefrom and washing said crystals with methyl ethyl ketone.

LEON GOLDMAN.

REFERENCES CITED

The following references are of record in the file of this patent:

Heyden Report, CMR-H-II, May 22, 1944, pp. 1 and 2 (abstracted in Science, vol. 104, Nov. 8, 1946, pp. 433 and 450).

Merck Report, CMR-M-77, Sept. 28, 1945, pp. 1, 2 and 3.

British Report, CMR-Br-141, CPS 382, Jan. 22, 1945, page 1.

British Report, CMR-Br-234, (PB 79927) CPS-687, Feb. 12, 1946, received in U. S. April 18, 1946, pp. 1 to 5.